(No Model.)
J. SEALAMER.
FRUIT PICKER.
No. 287,780. Patented Oct. 30, 1883.
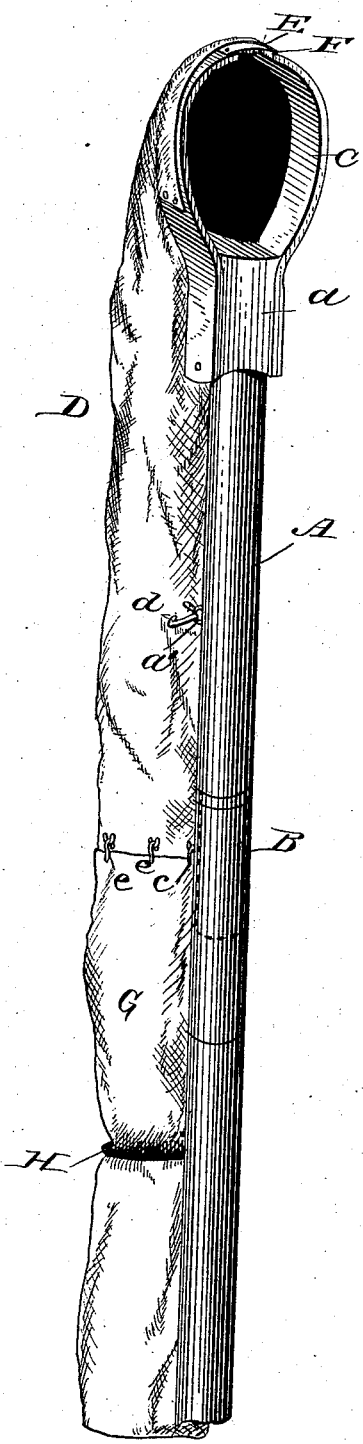
WITNESSES
Chas. Barker.
Jas. L. Falleig
John Sealamer,
INVENTOR
H. J. Ennis
Attorney

UNITED STATES PATENT OFFICE.

JOHN SEALAMER, OF PANA, ILLINOIS, ASSIGNOR OF ONE-HALF TO ZACCHEUS F. FLUHART, OF SAME PLACE.

FRUIT-PICKER.

SPECIFICATION forming part of Letters Patent No. 287,780, dated October 30, 1883.

Application filed August 4, 1883. (No model.)

To all whom it may concern:

Be it known that I, JOHN SEALAMER, a citizen of the United States, residing at Pana, in the county of Christian and State of Illinois, have invented certain new and useful Improvements in Fruit-Pickers, of which the following is a specification, reference being had therein to the accompanying drawing.

My invention has relation to devices for picking or gathering fruit from the trees, and its object is to provide a picker for fruit easily operated from the ground, and adapted to pick the fruit at different heights in a simple and convenient manner and without danger of bruising or damaging the fruit; and to these ends the novelty consists in the construction of the same, as will be hereinafter more fully described, and particularly pointed out in the claim.

The figure in the drawing is a perspective elevation of my improved fruit-picker.

A is the handle, and is provided with one or more socket-joints, B, which divide the handle into two or more sections for greater convenience in lengthening or shortening it, according to the height of the fruit on a tree, and to readily adapt it to different-sized trees.

C is a bow or yoke, bent in a circular or oval form, and having its ends secured to the head $a$ of the handle A.

D is a flexible chute, having an enlarged mouth, suitably secured to the bow C.

E is a knife secured on the arch of the bow C, a little back of the stem-recess F. This recess allows the bulk of the fruit to enter the bow before the knife cuts the stem.

The flexible chute D is provided with one or more extensions, G, to correspond to the sections of the handle A, and the sections G are provided with hooks $c$, for attaching it to the top chute by the eyes $e$.

H is an elastic band secured to the outside of the lower section, G, so as to compress it at that point and break the fall of the ripe fruit through the chute without injuring it.

The handle A is provided with a series of staples, $a'$, and the chute D with hooks $d$, which hold the chute close to the handle and prevent it from becoming tangled among the branches of the tree.

The picker may be packed in a very small space by unjointing the handle and chute.

Having thus described my invention, what I claim is—

The handle A, having enlarged head $a$, the bow C, made of a single piece, bent in oval form, and having its ends secured to said head, and provided with the recess F and knife E, in combination with the chute D G, having the elastic band H, and secured to the handle A B at intervals by the hooks $a'$ $d$, the whole combined and arranged substantially as specified.

In testimony whereof I affix my signature in presence of two witnesses.

JOHN SEALAMER.

Witnesses:
J. H. SIBLEY,
B. F. MAXFIELD.